June 23, 1964 A. G. COOLEY 3,138,426
PRESSURE-RESPONSIVE RECORDING
Filed Sept. 14, 1959 4 Sheets-Sheet 1

AUSTIN G. COOLEY
INVENTOR.
BY John J. Rogan
ATTORNEY

June 23, 1964 A. G. COOLEY 3,138,426

PRESSURE-RESPONSIVE RECORDING

Filed Sept. 14, 1959 4 Sheets-Sheet 2

AUSTIN G. COOLEY
INVENTOR.

BY John J. Rogan
ATTORNEY

June 23, 1964 A. G. COOLEY 3,138,426
PRESSURE-RESPONSIVE RECORDING
Filed Sept. 14, 1959 4 Sheets-Sheet 3
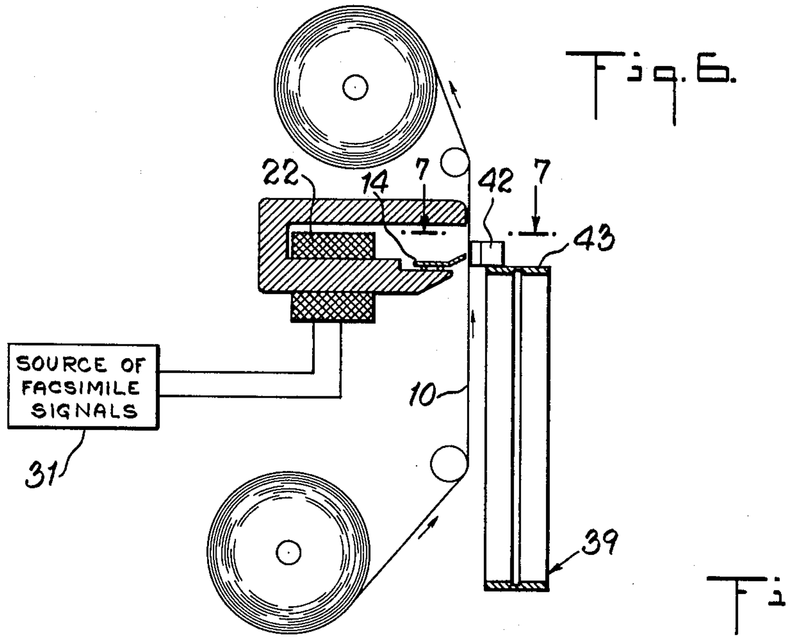
Fig. 6.
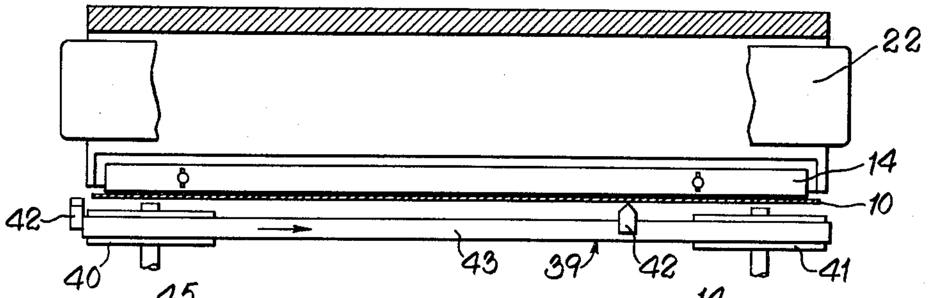
Fig. 7.
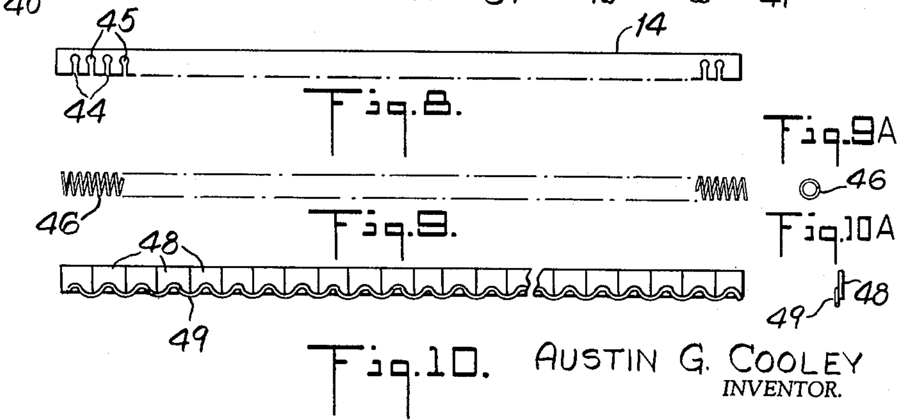
Fig. 8. Fig. 9. Fig. 9A Fig. 10A
Fig. 10.
AUSTIN G. COOLEY
INVENTOR.
BY John J. Logan
ATTORNEY

AUSTIN G. COOLEY
INVENTOR.

BY John J. Rogan
ATTORNEY

United States Patent Office 3,138,426
Patented June 23, 1964

3,138,426
PRESSURE-RESPONSIVE RECORDING

Austin G. Cooley, New York, N.Y., assignor, by mesne assignments, to Litton Systems Inc., a corporation of Maryland Filed Sept. 14, 1959, Ser. No. 839,959
14 Claims. (Cl. 346—101)

This invention relates to recorders and more especially to the visual recording of subject matter represented by electric signals.

A principal object of the invention is to provide improved methods and apparatus for translating electric signals into visual recordings of which so-called facsimile records are typical.

Another principal object is to provide a novel method and apparatus for precisionally controlling the recording pressure of a recording member on a pressure-responsive blank whereby more precise and finely detailed records can be made.

A further object is to improve the mechanism and operation of a facsimile recorder employing pressure-responsive record blanks, whereby one copy can be made or a multiplicity of recorded copies can be made simultaneously.

Various types of electrical recorders have been proposed heretofore and they may be classified into two general categories, namely those of the mechanical recording kind and those of the electrosensitive recording kind. The first category would include such devices wherein the recording mark is effected by the mechanical impact of a recording hammer or tool or by projecting a spray or column of marking fluid on to the recording surface. The second category would include such devices wherein the recording is effected by an electric current or discharge acting on or through the recording surface to make a record either by heat, by electrochemical, or even by photographic action. The second category of recorders has the draw-back that it is difficult to make more than one recorded copy at a time, although that type of recorder has the advantage of producing recorded copy of fine detail and over a relatively wide range of shade variations between black and white. The recorders of the first category have the advantage that a number of record copies can be simultaneously made, for example by using a plurality of record sheets which transfer the recording from sheet to sheet, for example by carbon paper or the like located between the various sheets. However, such recordings have not as great fineness of recording detail as those of the second category.

Accordingly one of the features of this invention is to provide a recording method and apparatus which combine the advantages of both the above categories of recorders.

Another feature relates to a novel arrangement for accurately controlling, over a wide range of values, the recording pressure of a recording element on a pressure-responsive recording surface.

Another feature relates to a recorder for electric signals, and employing a pressure-responsive surface which is acted upon by what may be termed a "free-floating" pressure device whose pressure on the said surface can be highly accurately controlled over a continuously wide range of values in response to received electric signals.

A further feature relates to a novel facsimile recorder of the intersecting edge kind, wherein one of the edges is in the form of a free-floating element arranged to be held continuously in contact with the recording surface so that substantially no marking is effected for a minimum level of received signal amplitude, and continuously graded markings can be produced over a wide range of received signal amplitudes beyond the minimum.

A further feature relates to an improved marking bar for so-called intersecting edge recorders wherein the bar can be maintained in continuous contact with the recording surface without producing undesired striated background in the recorded copy corresponding to the "spacing" or non-marking areas of the copy.

While, as pointed out hereinabove, mechanical type recorders have the advantage of being able to produce a number of recorded copies simultaneously, the marking unit or head has necessarily been of relatively large mass and weight. Furthermore, it was necessary, because of that weight, to space the bar from the recording surface corresponding to the non-marking or "spacing" intervals between marking signals. If not so spaced, the vibration and unavoidable variations in the surface configuration of the intersecting edge of the helix anvil carried by the scanning drum for platen, and also the unavoidable play in the mountings of the bar and its magnetic operating armature, cause undesirable striations or strakings in the recorded copy where no such markings should appear. That gives the finished recording an annoying streaked background. Furthermore, with the usual movable bar constructions the natural period of vibration of the movable system, including the bar and its associated actuating armature, in combination with the necessary linkages, usually cause the movable system to have a low natural period of vibration. To eliminate chatter, it has been necessary heretofore to damp the movable system with loading devices, such as springs or rubber contact members, but the loading generally absorbs more power than that required for the actual printing. The net result was that because of the mass of the moving system and recorder head, and because of the spacing required between the recording bar and record surface, as well as because of the necessary damping, the maximum recording speed was quite limited as compared with the other kinds of recorders. In addition, careful assembly and adjustments had to be made for satisfactory operation when replacing a recording element, and even during normal operation of the machine, in order to counteract the effects of wear and the like. These draw-backs in the mechanical category of recording apparatus of the prior art have hampered the use of that kind of equipment notwithstanding the advantages of inexpensive recording media and plural copy production.

One of the main objects of this invention, therefore, is to overcome the above noted draw-backs by constituting the marking element and the magnetically operated armature as a single element capable of high speed operation, and by eliminating all pivotal supports and the like as well as the biasing spring or other biasing element which has heretofore been used to retain the marking element in its retracted or non-marking position. As a result of the invention, the effects of wear and the necessity for readjustment are minimized and the replacement of the marking element when necessary is simplified.

In accordance with one feature of the invention, the marking element may be in the form of a slender bar or elongated rod of ferromagnetic material which is located in the air gap of a signal-controlled electromagnet, through which gap the recording surface or web is fed. The said marking member is maintained in contact with the recording surface, but the pressure can be so adjusted electromagnetically that the contact does not result in any markings on the record blank in the absence of received marking signals. The said marking member is in effect freely floating and in one form merely rests upon the end of the core of the electromagnet so that it freely slides or rolls towards and away from the marking position in response to the marking and spacing signals. It will be understood, of course, that the marking member, instead of being in continuous contact with the recording surface may be slightly spaced therefrom when space signals are being received. In order to limit the recording to successive minute elemental areas of the record blank, a movable anvil or the like is arranged on the opposite side of the blank from the marking member to form intersecting edges which define a small contact point so that the location of that point with respect to the record surface can be synchronized with the successive elemental areas scanned by the corresponding facsimile transmitter.

A further feature of the invention relates to the novel organization, arrangement and relative location and interconnection of parts which cooperate to provide an improved facsimile recorder or the like.

In the drawing which shows, by way of example, certain embodiments,

FIG. 6 is an end elevational view of a further modification of FIG. 1;

FIG. 7 is a sectional view of FIG. 6 taken along the line 7—7 thereof;

FIGS. 8, 9 and 10 are views showing respective modifications of the marking bar of FIGS. 1 to 7;

FIGS. 9A and 10A are end views respectively of FIGS. 9 and 10;

Figures 1, 2:
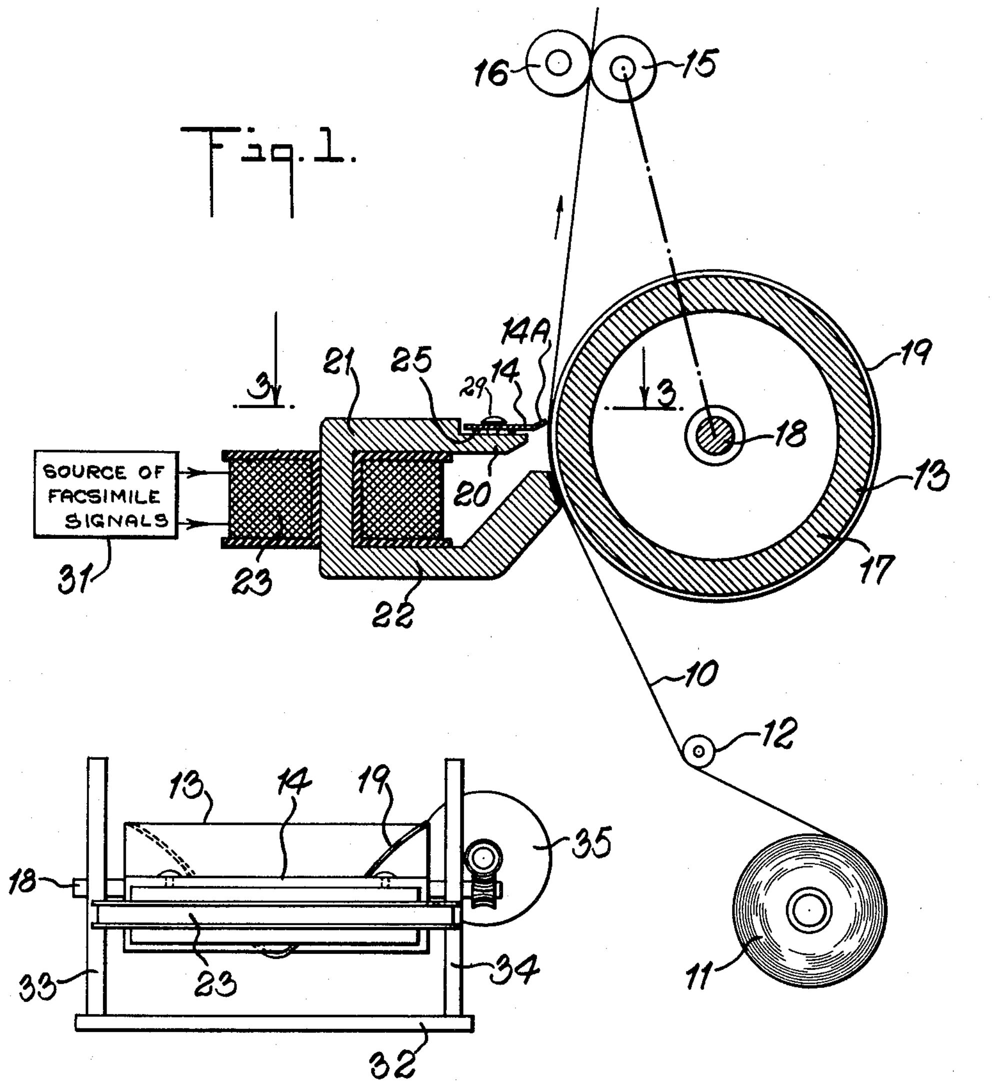
FIG. 1 is a side elevational view of the essential parts of a facsimile machine for practicing the invention.
FIG. 2 is a front elevational view of the machine partly illustrated in FIG. 1.
Figure 3:
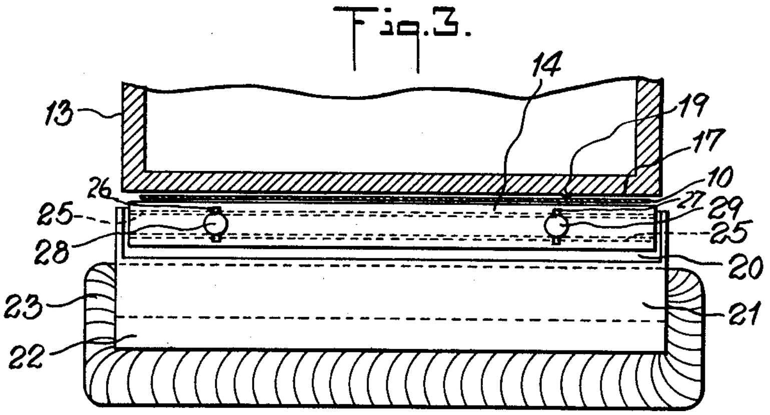
FIG. 3 is a sectional view of FIG. 1 taken along the line 3—3 thereof.

Referring to FIGS. 1, 2 and 3, there are shown the more important parts of a facsimile recorder embodying the invention. The numeral 10 represents a web or sheet of recording material of any well known kind comprising for example a flexible backing of paper or other material having its surface provided with a pressure-responsive coating. Such coatings are well known in the recording art and are usually of a kind which normally is opaque or at least non-translucent, but when subjected to pressure in localized areas the coating at those areas becomes either transparent or translucent, or may even be entirely removed to expose the contrasting color of the backing, thus producing the desired visible recorded information. Typical examples of such pressure-responsive blanks are disclosed in Harold R. Dalton U.S. Patents Nos. 2,313,808 and 2,313,810.

It will be understood that the web or recording blank 10, instead of being a single sheet, may consist of two or more similar sheets, so that as they are simultaneously subjected to pressure at the recording areas, a similar record is produced simultaneously on all the sheets. In fact, if desired the sheet 10 may be a pressure-sensitive sheet and the remaining sheets may be of ordinary paper with interleaved sheets of conventional carbon transfer paper such as is ordinarily used in making carbon copies. Merely for simplicity in the drawing, the sheet 10 is shown as a single sheet of pressure-responsive paper.

The recording sheet or blank 10 can be reeled off from a supply roll 11 and around one or more idler rollers 12, and thence upwardly between the rotatable "scanner" 13 and the horizontal elongated recording bar 14. The paper blank may pass between a pair of paper feed rollers 15, 16 to a suitable receiving reel (not shown). The paper 10 is fed in the direction of the arrow in fixed time relation to the rate of rotation of the member 13 as is well known in the facsimile recording art. Preferably the forward edge 14A of bar 14 which presses against the paper 10 is inclined or bent in the direction of the paper travel.

The scanner 13 consists of a drum 17 of iron or other ferromagnetic material mounted on a suitable driving shaft 18 which is driven in timed relation with the feed rollers 15, 16. The surface of the drum 17 is provided with a helix rib 19 which is knife-edged or similarly small in cross section and is arranged to have its apex intersecting with the recording bar 14 in a minute elemental area. As shown more clearly in FIG. 2, the bar 14 extends parallel to the length of the scanner 13 so that the forward edge of the bar 14 intersects the helical rib 19 as the scanner 13 rotates. In the manner well known in the facsimile recording art, the paper feed is controlled in timed relation to the rotation of the scanner 13 so that the recording sheet 10 is scanned in successive spaced linear scanning lines and by reason of the intersecting relation between the linear edge of the recording bar 14 and the apex of the helix 19, each linear element is scanned in successive minute elemental areas.

In accordance with one phase of the invention, the recording bar 14 is supported in what may be termed a free-floating manner and is arranged to be held in contact with the recording sheet 10 by magnetic lines of force between the recording bar 14 and the drum 17. For that purpose the bar 14, which may be in the form of a slender, flat strip of magnetizable metal, rests, for example, on the flat face of one of the poles or legs 20 of the core 21 of an electromagnet 22 shown as extending across the entire width of sheet 10. Electromagnet 22 is provided with a corresponding elongated magnetizable winding 23. The opposite pole or leg 24 of the electromagnet is preferably extended so as to be in closely spaced relation to helix 19. If desired, the forward face of leg 24 may be curved to conform to the face of drum and thus reduce magnetic reluctance of the magnetic circuit. In order to achieve the free-floating effect on recording bar 14, it rests on a series of anti-friction bearing members, such for example as ball-bearings or roller bearings 25 suitably located in the upper face of leg 20. While such anti-friction bearings provide the optimum free-floating effect, they may be dispensed with but at the sacrifice of speed and efficiency. In order to prevent the bar 14 being dislodged, it may be provided with a pair of slots 26, 27, through which extend fixed pins 28, 29 carried by the leg 20. These slots and pins are such as not to offer any appreciable frictional drag on the free-floating movement of the recording bar 14.

As indicated in FIG. 1, the elongated flat strip recording bar 14 extends beyond the leg 20 into the magnetic gap 30 between that leg and the magnetic return provided by the magnetic drum 17. The bar 14 therefore constitutes in a single element a movable armature for the electromagnet and also a recording bar for subjecting the recording blank 10 to the required recording pressure at each elemental area defined by the intersection between the forward edge of bar 14 and the helical rib 19. When the winding 23 is energized, it urges the bar 14 against the surface of the recording blank 10, namely moving it in a direction to decrease the reluctance of the magnetic circuit formed by the poles 20, 24 and the magnetic drum 17. It should be observed that apart from the magnetic effort resulting from the energization of winding 13, the bar 14 stays put, that is, it is free from any biasing springs or the like. If desired, the assembly comprising the electromagnet and recording bar 14, instead of being mounted so that the bar 14 is horizontal, may be adjustably mounted so that the bar 14 is at a slight downward angle facing towards the drum 17 so that the bar rests against the blank 10 lightly as a result of its own weight. This normal contact of the recording bar against the blank 10 is so light that it does not result in any markings on the blank in the absence of any energizing signal currents applied to the winding 23. The winding 23 can be energized under control of any well known source 31 of facsimile electric signals. It will be understood, of course, that in the well known manner the said source has a movable scanning mechanism which is operated in synchronized relation with the rotation of member 13 so that the electric signals corresponding to each successive elemental area of the scanned subject matter at the transmitter are synchronized with the location of the corresponding scanned element of the blank 10.

The foregoing described arrangement enables the received facsimile signals to precisely control the pressure of the edge of the recording bar 14 on the recording blank 10. This pressure may be varied between that necessary to produce no marking and that necessary to produce the heaviest or darkest marking so that the blank 10 can record continuous gradations of shade between white and black. When the facsimile signals are impressed on the winding 23, the recording bar 14 is urged against the surface of the blank 10, and therefore against the helical rib 19 acting as an anvil, to produce marking pressure of the desired value at the instantaneous scanned elemental area of the blank 10. When the facsimile signals are of zero or minimum amplitude corresponding to no marking, the pressure of the recording bar 14 on the blank 10 is relieved and no marking of that blank occurs. Normally the marking bar 14 remains in contact with the blank 10 at all times so that a definite minimum level of facsimile signals is required to produce a mark. In actual construction, the movement of the recording bar 14 may be only a fraction of a thousandth of an inch. Of course, if the recording is to be effected simultaneously on a series of stacked transfer sheets between the blank 10 and the scanner 13, a somewhat heavier pressure may be required, and also this pressure may be normally adjusted depending upon the hardness or pressure-responsive characteristics of the coating on the blank 10. By reason of the fact that the movement of the bar 14 is in any case a minute value, for example less than a thousandth of an inch, and since it can be made of thin, light weight stock and is unrestrained in movement, the speed of recording on the blank 10 can be greatly increased over that obtainable with prior mechanical recorders of the helix-recording bar kind.

The invention is not limited to any particular manner of supporting the scanner and recording bar portions of the machine. Merely for illustration, FIG. 2 shows a supporting base 32 having uprights 33, 34 in which the shaft 18 of the scanner 13 is rotatably mounted. The scanner can be driven by any well known synchronous motor 35 for driving the scanner 13 at the required synchronous rate.

Figure 5:
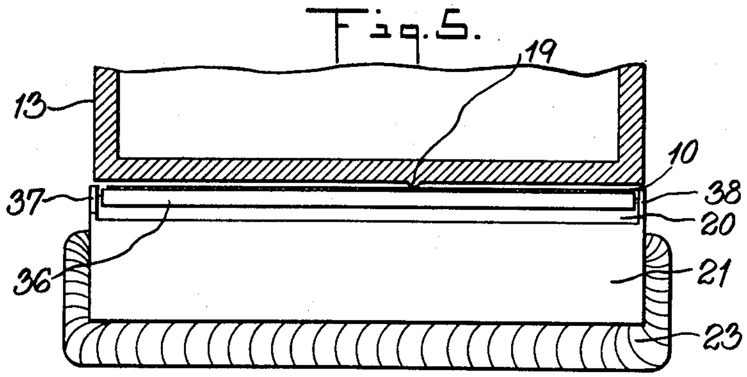
FIG. 5 is a sectional view of FIG. 4 taken along the line 5—5 thereof.
Figure 4:
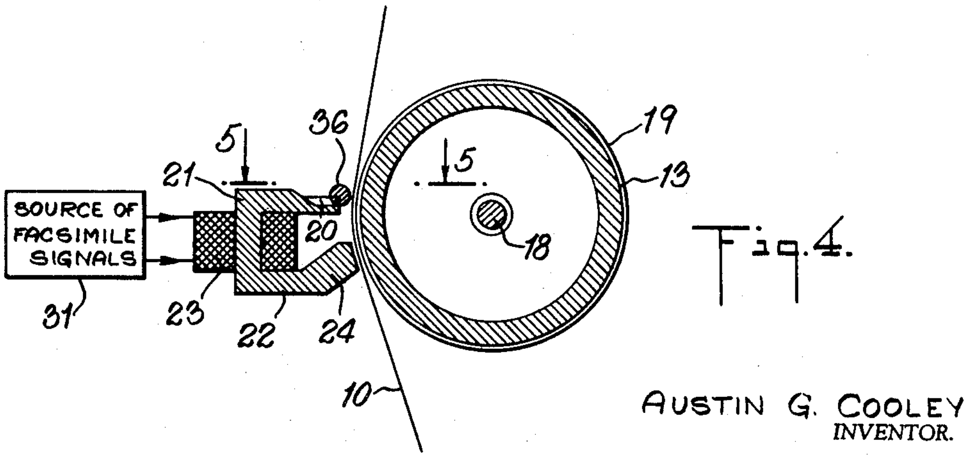
FIG. 4 is an end elevational view of a modification of FIG. 1.

FIGS. 4 and 5 show a modification wherein the recording bar, instead of being a thin, flat metal strip, is in the form of a round rod 36 of magnetizable material. The rod is arranged to roll on the upper flat face of the pole 20 and is prevented from lateral shifting movement by suitable flanges 37, 38 on the ends of the said pole. This embodiment has the advantage that the rod is free to roll without restraint towards the recording blank and is rotated around its longitudinal axis by the longitudinally feeding movement of the blank 10, thus distributing any wear that may tend to result by abrasion at the point of contact with recording blanks. Here again the rod 36 forms in a single member both the movable armature and recording bar of the recording mechanism and is located in the air gap 30 as above described.

It will be understood that the invention is not limited to the particular type of intersection bar-anvil recorder shown in FIGS. 1 to 5. It is equally applicable to other types of recorders. For example, there is shown in FIGS. 6 and 7 a facsimile recorder of the endless moving band kind, disclosed in U.S. Patent No. 2,717,822 to Austin G. Cooley. This metal band 39 extends around a pair of pulleys 40, 41, and the band carries one or more anvils 42 each in the form of a chisel-pointed metal block of magnetizable material. One of the pulleys, for example pulley 41, has its shaft connected to a suitable source of synchronous driving power (not shown) for moving the anvil 42 at the required synchronized speed across the width of the recording blank 10. For clarity in the drawing, FIG. 6 omits the pulleys 40, 41. For a detailed description of one preferred manner of driving the band 39 and the anvil 42 at the required precise synchronous speed, reference may be had to U.S. Patents 2,643,173 and 2,643,174, granted to Austin G. Cooley. Cooperating with the anvil 42 is the magnetically shiftable freely floating recording bar 14, which may be of any of the constructions above described and which is arranged to be moved into precisely controlled pressure against the recording blank 10 and against anvil 42 by means of an electromagnet 22 energized from a suitable source 31 of facsimile signals. The functional cooperation between the recording bar 14 and the magnetizable anvil 42 is substantially the same as that above described in connection with the elements 14 and 19 of FIG. 1.

In order to distribute the wear on the anvil 42, the pulleys 40 and 41 may be mounted with the line joining their axes at a slight angle with respect to the length of the recording bar 14 so that the upper span 43 of the anvil carrying belt traverses a slightly inclined path with respect to the edge of the bar 14, thus distributing the wear on the chisel edge of the anvil 42.

In the foregoing embodiments the recording bar 14, whether in the form of a flat, thin metal strip (FIG. 1) or in the form of a round metal rod (FIG. 5), is longitudinally rigid. In certain cases it may be advantageous to have the marking edge of the recording bar somewhat more laterally flexible. A typical construction of that kind is illustrated in FIG. 8, wherein the recording bar 14 is provided with a multiplicity of lateral slits 44 terminating in somewhat larger openings 45, thus enabling the bar 10 to be flexed in a direction to impart curvature to the marking edge. This particular construction has the double advantage of enabling the recording bar to accommodate itself to any inaccuracies in the dimensions of the helical anvil 13, and it also has the advantage that at very high speeds of recording the particular portion of the bar which is in intersecting relation with the helical rib 19 can be flexed without requiring the entire length of the bar to be bodily moved towards the scanner 13 at the same high rate. In other words, the bar as a whole is freely floatable and the particular section that is effective in recording can respond by flexure to accommodate the high recording speeds. It will be understood, of course, that FIG. 8 shows only one typical manner of making the recording bar laterally flexible. A modified form of this flexible bar is shown in FIGS. 9 and 9A. It may consist of a tightly and closely wound coiled iron wire 46. Instead of using a lateral flexible longitudinally rigid recording bar, the bar may be made up of a multiplicity of side-by-side smaller bars 48 which are longitudinally joined by a thin flexible cord 49 as shown in FIGS. 10 and 10A.

Figures 11, 12, 13, 14, 15:
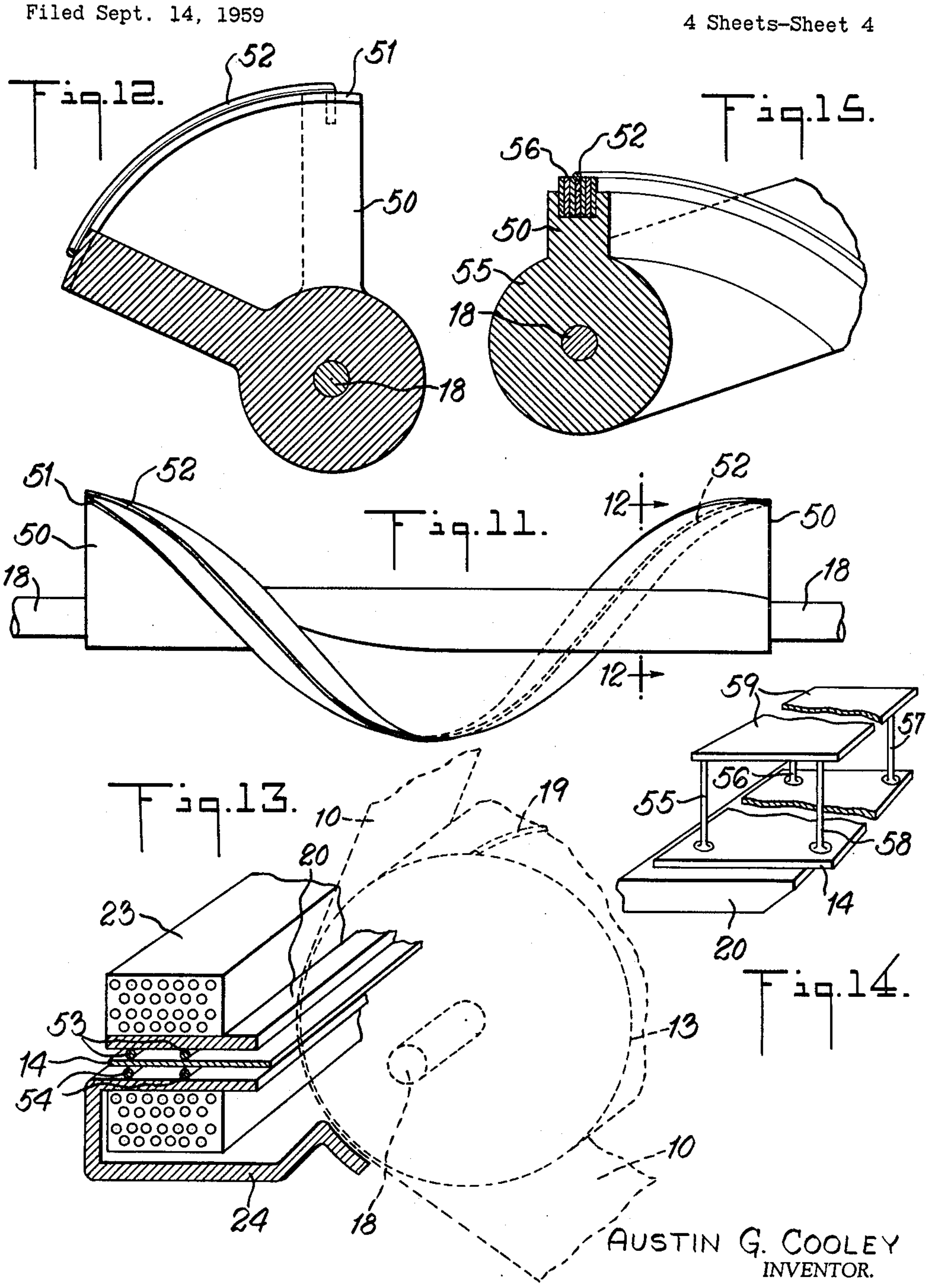
FIG. 11 is a detailed view of a modification of the helix anvil according to the invention.
FIG. 12 is a sectional view of FIG. 11 taken along the line 12—12 thereof.
FIG. 13 is a further modification of the invention.
FIG. 14 is a schematic representation of still further modification of the invention.
FIG. 15 is a sectional view of part of another modification of the anvil.

FIGS. 11 and 12 show a modification of the scanner 13 of FIGS. 1 to 5. In this embodiment the shaft 18 has keyed or otherwise fastened thereto an aluminum or other light weight non-magnetizable casting 50 which is of helical configuration and has a flat top to which is welded a flat helical ferromagnetic plate 51. The purpose of plate 51 is to confine the magnetic flux from the signal energized electromagnet (22 of FIG. 1) between the floating recorder bar 14 and the record blank 10. The upper face of strip 51 can be provided with a central groove in which is fastened steel wire 52 which corresponds functionally to the helical rib or anvil 19 of FIGS. 1 to 5. If desired, the plate 51, instead of being grooved to receive the anvil wire 52, may have an integral raised rib machined thereon to form the helical anvil.

FIG. 13 shows a modification of FIGS. 1 to 5 wherein the recording bar 14 is supported for floating movement on upper and lower elongated roller bearings 53, 54 and located within the rectangular interior opening of the elongated magnetizing winding 23 which may be of the same construction as that of FIG. 1. The bar 14 has its right hand or recording edge located in the magnetic gap between the pole 20 and the scanner 13.

FIG. 14 shows a modified manner of supporting the elongated recording bar 14 for floating motion. In this embodiment the bar 14 is suspended in slightly spaced relation to the upper face of the pole 22 by means of two or more sets of very thin wires or strings 55, 56, 57, 58 attached to a suitable stationary bar or support 59. This enables the recorder bar 14 to freely float while being magnetically attracted to the scanner under control of the facsimile signals as above described.

FIG. 15 shows a modification of the anvil. Like the embodiment of FIG. 12 it comprises a cylindrical member 55 having an integrally formed helical rib or flange 50. However, in order to reduce the weight of the rotating parts, members 50 and 55 can be made of aluminum or any light weight alloy. In order to provide the requisite magnetic return path to the recording bar 14, the upper edge of rib 50 has a recess into which is fastened in any suitable manner a laminated iron insert 56. This insert which may comprise a series of laminations, extends above the edge of rib 50. One or more of the central laminations may be of smaller height than the remaining laminations to define a central groove in which the anvil wire 52 is fastened as by welding, brazing or the like.

Other changes and modifications may be made in the disclosed embodiments without departing from the spirit and scope of the invention.

What is claimed is:

1. A signal-controlled marking mechanism for electric signal recorders and the like, comprising a pair of members defining pressure jaws of elemental pressure area and between which a recording blank is arranged to be moved, one of said members being a backing anvil and the other being a recording magnetizable bar, a stationarily mounted signal energized electromagnet whose movable armature is constituted of said bar, and pivotless means supporting said bar for signal controlled horizontal movement to exert pressure on said blank, said supporting means exerting substantially no mechanical prefixed biasing effort on said bar tending to move said bar towards or away from the blank.

2. A signal-controlled marking mechanism for electric signal recorders and the like, comprising a movable blank scanning member having an anvil and another member in the form of an elongated recording element having a straight edge which intersects said anvil to define an elemental blank scanning spot, said other member being movable in the horizontal plane of said straight edge means to move said anvil to cause said spot to scan the blank in successive elemental areas, a stationarily mounted signal energizable electromagnet, and means mounting said elongated recording element within the field of said electromagnet to constitute it the movable magnetizable armature of said electromagnet whereby said element is actuated directly by the signal-controlled field of said electromagnet to exert a corresponding signal controlled pressure on the blank.

3. A signal-controlled marking mechanism according to claim 2 in which said recording element is in the form of a thin flat magnetizable strip which extends across substantially the entire recording width of the blank, and is stiffened and supported by a flat substantially horizontal surface of said electromagnet.

4. A signal-controlled marking mechanism according to claim 2 in which said recording element is a roller in the form of a round bar.

5. A signal-controlled marking mechanism according to claim 2 in which said elongated recording element comprises a series of adjacent sections each individually shiftable towards the blank and means to maintain said sections in a linear longitudinal array except at the recording region where said element intersects said anvil.

6. An electric signal recorder comprising a pair of members constituting a pair of pressure jaws between which a pressure-responsive blank is to be moved, said jaws being relatively movable in intersecting relation to define a movable scanning spot for marking the blank, one of said members being constituted of an elongated bar-like magnetizable element which extends across substantially the entire recording width of the blank, an electromagnet means to cause the bar to be moved substantially in the horizontal plane in the direction of its narrow dimension by electromagnetic action without substantially changing the position of the bar lengthwise, and means supporting said bar so that it is substantially entirely free from mechanical connections tending to cause it to assume a prefixed normal position toward or away from the blank.

7. A recorder according to claim 6 in which said bar is of thin flat ferromagnetic stock and is located within the magnetic gap of said electromagnet.

8. An electric recorder according to claim 6 in which the other of said jaws is in the form of an anvil, an endless synchronous movable carrier to which said anvil is attached for moving said anvil substantially parallel to the longitudinal edge of said bar-like element.

9. An electric recorder according to claim 8 in which said carrier is an endless band having a span extending along the length of said edge of said bar-like element.

10. A marking unit for electric recorders, comprising a signal-energized magnetizing winding, a strip of magnetizable material constituting a movable armature for said winding said armature having an elongated edge which is disposed to exert controlled pressure on a recording blank in response to signal energization of said winding, and means including a substantially horizontal sliding-contact support for supporting said armature for bodily sliding movement toward the blank.

11. A marking unit according to claim 10 in which said magnetizing winding has a magnetic core having a flat top surface constituting the support on which said armature rests for said sliding movement.

12. A recorder comprising means to move a recording blank past a recording point, said blank being of the pressure-responsive type, means to subject the blank to a signal controlled pressure to mark the blank correspondingly, the last-mentioned means including a backing member for the blank, a straight elongated magnetizable strip or rod provided with a rectilinear edge to contact said blank, electromagnetic means including a gapped core for actuating said strip or rod to produce marking pressure on said blank, and means for supporting said strip or rod for substantially horizontal movement adjacent the gap in said core to form a movable armature for said electromagnetic means without any mechanical connections to said supporting means which tend to cause it to assume a definite normal position with respect to the surface of the blank.

13. A recorder comprising an electromagnet, means for applying recording signals to said electromagnet and means to move a pressure-responsive recording blank past a recording point, a pair of marking members, one of said members being a substantially rigid backing for said blank and the other of said members being actuated by the magnetic flux traversing said electromagnet, and pivotless means supporting said other member for substantially unrestrained horizontal movement towards said blank in response to the energization of the electromagnet, said pivotless supporting means being substantially entirely free from mechanical biasing means tending to bias said other marking member towards or away from the blank.

14. A signal-controlled marking mechanism for marking a recording blank, comprising an electromagnet and a pair of spaced members constituting pressure jaws between which the blank is moved, one of said members being a backing anvil for supporting the blank and the other member being an elongated strip or rod provided with a rectilinear edge disposed in contact relation to said blank, and means including a substantially horizontal sliding-contact supporting underneath the other member for supporting said other member for actuation by said electromagnet in a horizontal direction and substantially free from mechanical restraint and from mechanical connections tending to cause said other member to assume a fixed position in respect to the backing anvil in the absence of recording signals.

References Cited in the file of this patent

UNITED STATES PATENTS

| | | |
|---|---|---|
| 1,763,008 | Priessman | June 10, 1930 |
| 2,591,640 | Tribble | Apr. 1, 1952 |
| 2,680,056 | Olden | June 1, 1954 |
| 2,785,039 | Artzt | Mar. 12, 1957 |
| 2,838,358 | Wattles | June 10, 1958 |
| 2,906,582 | Page | Sept. 29, 1959 |
| 2,962,340 | Alden | Nov. 29, 1960 |